C. A. VIDINGHOFF.
BEARING FOR WEIGHING SCALES.
APPLICATION FILED OCT. 2, 1911.
1,012,303.
Patented Dec. 19, 1911.
2 SHEETS—SHEET 2.
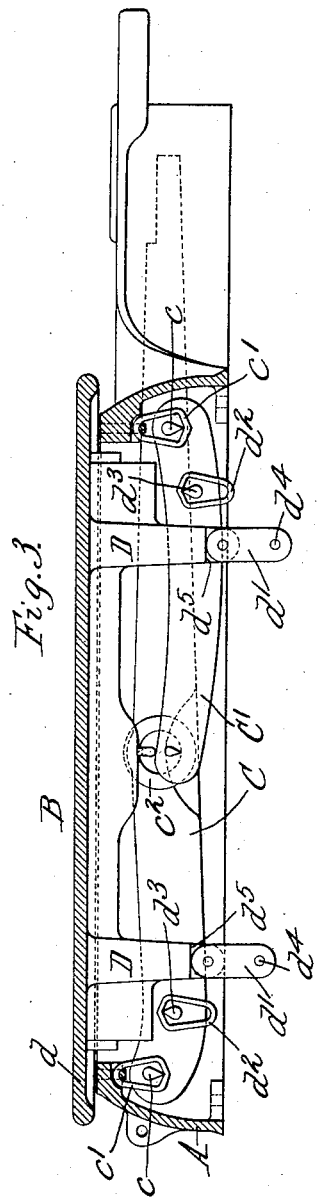
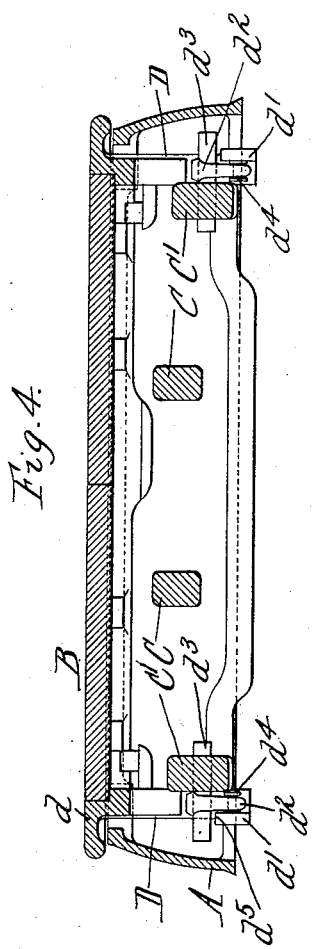
Witnesses:-
A. Borkenhagen.
George H. Walter
Inventor
Charles A. Vidinghoff.
By Wilhelm, Parker & Heard,
Attorneys.

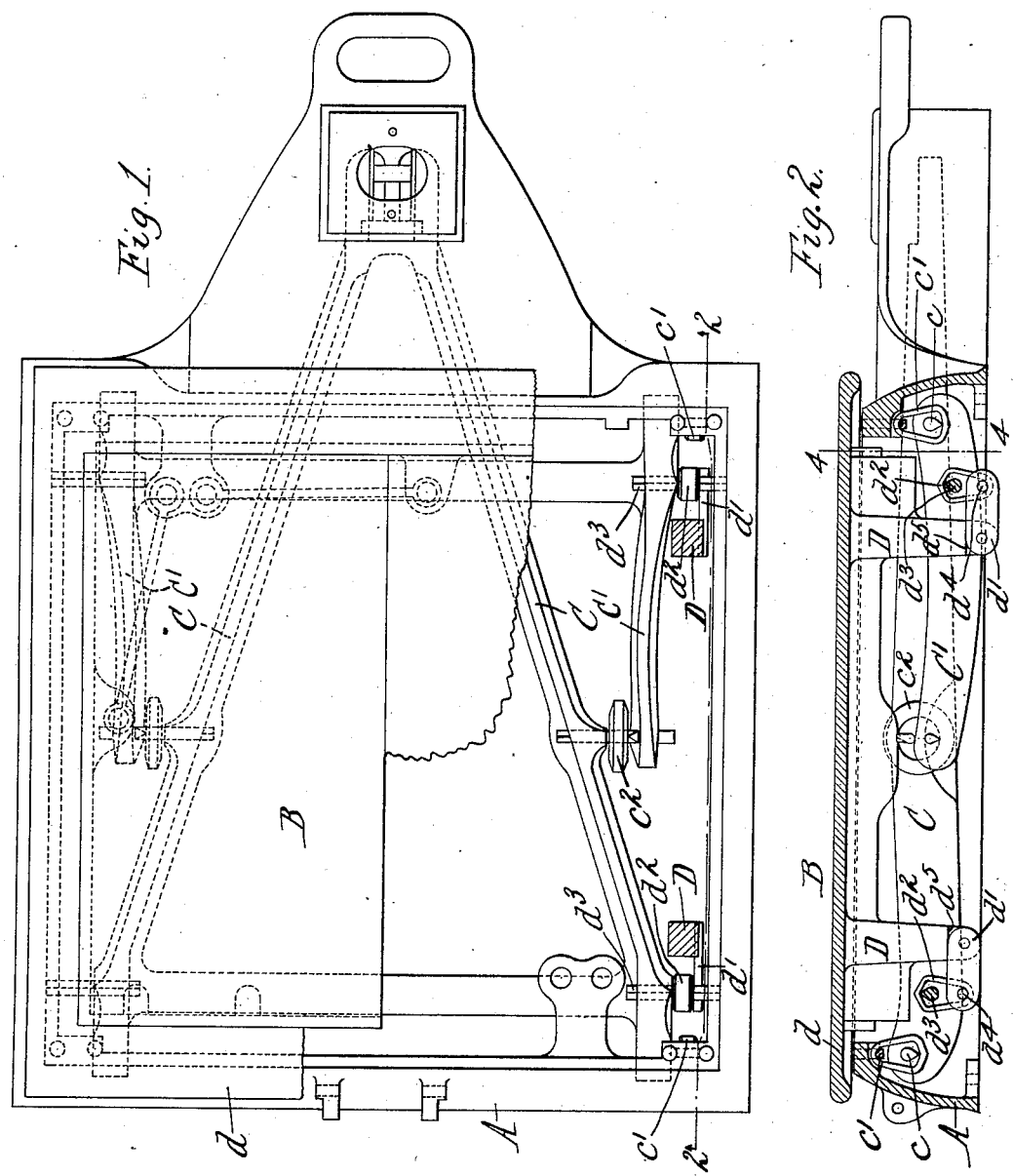

UNITED STATES PATENT OFFICE.

CHARLES A. VIDINGHOFF, OF BUFFALO, NEW YORK, ASSIGNOR TO BUFFALO SCALE COMPANY, OF BUFFALO, NEW YORK.

BEARING FOR WEIGHING-SCALES.

1,012,303. Specification of Letters Patent. Patented Dec. 19, 1911.

Application filed October 2, 1911. Serial No. 652,257.

*To all whom it may concern:*

Be it known that I, CHARLES A. VIDINGHOFF, a citizen of the United States, residing at Buffalo, in the county of Erie and State of New York, have invented a new and useful Improvement in Bearings for Weighing-Scales, of which the following is a specification.

This invention relates more particularly to platform weighing scales of that kind in which the platform is connected to the supporting levers located thereunder by suspension or swinging bearings which permit a limited horizontal shifting of the platform without danger of injury to the knife edges of the bearings.

The object of the invention is to provide a practical and desirable suspension bearing for scales which is of a simple and inexpensive construction that enables the scale platform to be connected with the supporting levers more quickly and with less labor than bearings heretofore employed.

In the accompanying drawings, consisting of two sheets: Figure 1 is a plan view of a platform scale embodying the invention, the platform being partially broken away to disclose the underlying parts. Fig. 2 is a longitudinal sectional elevation thereof in line 2—2, Fig. 1. Fig. 3 is a similar longitudinal sectional elevation thereof, showing the platform disconnected from the levers. Fig. 4 is a transverse sectional elevation thereof in line 4—4, Fig. 2.

Like reference characters refer to like parts in the several figures.

With the exception of the suspension bearings which connect the platform with its supporting levers, and which are hereinafter described, the scale may be of ordinary construction.

A represents the scale base or frame, which may be of any suitable construction adapted for either a portable or a stationary scale; B the platform, and C C' the platform levers. The platform levers, as usual, are fulcrumed on the base and connected to each other by knife edge or other bearings of any suitable construction; the platform is supported by the levers, and one lever C is connected to the balancing beam by suitable means (not shown.) In the construction shown, each lever is fulcrumed to the frame A by knife edges $c$ on the lever which bear in loops $c'$ suspended from the frame A, and the levers are connected by rings or loops $c^2$ into which project knife edges on the levers.

The platform B is provided with legs D for connection with the platform levers C C'. The platform shown consists of a flooring confined in a rectangular metal frame $d$, and the legs D depend from the corner portions of this frame. The platform can, however, be of any other suitable construction and the legs can be formed thereon or secured thereto in any convenient way at suitable points, which will depend upon the shape and arrangement of the platform levers. Pivoted to the legs D are feet or extensions $d'$ which are pivotally connected to swinging loops or links $d^2$ suspended from the platform levers. Preferably the loops or links $d^2$ hang on knife-edged pins $d^3$ projecting from the levers, and the feet or extensions have headed studs $d^4$ which bear in the lower ends of the loops. When placing the platform in position on the levers the feet or extensions $d'$ hang down from the legs D, as shown in Fig. 3, and they are then turned up into the horizontal position shown in Figs. 2 and 4, and their studs $d^4$ engaged in the loops or links $d^2$. There is sufficient lateral play or movement of the parts to permit the studs to be readily engaged in the links. The feet or extensions $d'$ are prevented from swinging upwardly beyond the horizontal position shown in Fig. 2 by the engagement of the edges of the links with shoulders $d^5$ on the legs, or other suitable means are provided for limiting the upward movement of the feet or extensions, so that when the feet or extensions are connected with the loops or links $d^2$ these loops or links support the platform just as if they were connected to rigid parts of the legs. When the parts are in place the feet or extensions $d'$ form, in effect, rigid extensions of the legs.

By providing the platform with jointed supporting legs or parts of the nature described which are adapted to be connected to the suspension loops or bearings after the platform has been placed in position on the scale base, the work of connecting the platform with the platform levers is greatly simplified and considerable time and labor are saved in this operation. Nevertheless the platform is attached to the supporting levers in such a way as to prevent it from being accidentally displaced or lifted off of the levers.

I claim as my invention:

1. In a weighing scale, the combination with the platform, and platform levers, of suspension bearings by which said levers support the platform, said suspension bearings comprising swinging bearing members, and supporting legs provided with extensions connected to the legs by joints which allow said extensions to swing in one direction and limit the swing of the extensions in the opposite direction, substantially as set forth.

2. In a weighing scale, the combination with the platform, and platform levers, of swinging bearings suspended from said levers, legs depending from said platform and having pivoted extensions connected to said swinging bearings, and means which limit the upward swing of said extensions, substantially as set forth.

3. In a weighing scale, the combination with the platform, and platform levers, of swinging bearings suspended from said levers, legs depending from said platform, and extensions pivoted to said legs and to said swinging bearings, said legs having parts adapted to engage said pivoted extensions to limit the upward swing thereof, substantially as set forth.

4. In a weighing scale, the combination with the platform, and platform levers, of bearing loops suspended from knife edges on said levers, legs depending from said platform, and extensions pivoted to said legs and having studs bearing in said loops, said legs having parts adapted to engage said pivoted extensions to limit the upward swing thereof, substantially as set forth.

Witnesse my hand, this 29th day of September, 1911.

CHARLES A. VIDINGHOFF.

Witnesses:
F. E. Prochnow,
A. L. McGee.

Copies of this patent may be obtained for five cents each, by addressing the "Commissioner of Patents, Washington, D. C."